(12) United States Patent
Wang et al.

(10) Patent No.: US 7,022,639 B2
(45) Date of Patent: Apr. 4, 2006

(54) CATALYTIC ACTIVITY ACCELERANT USED IN PETROLEUM HYDROGENATION

(75) Inventors: Jintang Wang, Jiangsu (CN); Jianning Guan, Jiangsu (CN); Houliang Dai, Jiangsu (CN); Lijin Zhou, Jiangsu (CN); Minghui Tang, Jiangsu (CN); Yuming Zhang, Jiangsu (CN); Pingkai Ouyang, Jiangsu (CN); Chengfeng Li, Jiangsu (CN); Chaorong Dai, Jiangsu (CN); Jingyi Wang, Jiangsu (CN)

(73) Assignee: Nanjing University of Technology, Jiangsu (CN)

( * ) Notice: Subject to any disclaimer, the term of this patent is extended or adjusted under 35 U.S.C. 154(b) by 261 days.

(21) Appl. No.: 10/398,072

(22) PCT Filed: Sep. 7, 2001

(86) PCT No.: PCT/CN01/01345

§ 371 (c)(1),
(2), (4) Date: May 22, 2003

(87) PCT Pub. No.: WO02/40153

PCT Pub. Date: May 23, 2002

(65) Prior Publication Data

US 2004/0029721 A1 Feb. 12, 2004

(30) Foreign Application Priority Data

Oct. 8, 2000 (CN) .................................. 00112597 U

(51) Int. Cl.
  *B01J 31/00* (2006.01)

(52) U.S. Cl. ................. 502/150; 502/113; 508/291
(58) Field of Classification Search ................. 502/150, 502/113; 508/291
  See application file for complete search history.

(56) References Cited

U.S. PATENT DOCUMENTS 3,919,075 A * 11/1975 Parc et al. .................. 208/180
4,171,273 A * 10/1979 Waldbillig et al. .......... 508/291
4,507,303 A *  3/1985 Ishizumi et al. ........ 514/252.19
4,612,132 A *  9/1986 Wollenberg et al. ........ 508/291
4,614,603 A *  9/1986 Wollenberg ................ 508/291
4,617,138 A * 10/1986 Wollenberg ................ 508/291
4,618,438 A * 10/1986 Toukan et al. .............. 508/231
4,747,850 A *  5/1988 Wollenberg et al. ......... 44/330
5,274,139 A * 12/1993 Drago et al. ................ 549/529
5,334,566 A    8/1994 Gibler et al. ............... 502/113
5,494,568 A    2/1996 Simpson et al. .............. 208/46
5,681,799 A * 10/1997 Song et al. ................. 508/454
5,716,912 A *  2/1998 Harrison et al. ............ 508/192
5,759,967 A *  6/1998 Song et al. ................. 508/454
6,468,946 B1 * 10/2002 Vinci ........................ 508/398
6,569,818 B1 *  5/2003 Nakazato et al. ........... 508/185
6,706,893 B1 *  3/2004 Werpy et al. ............... 548/552
2003/0216266 A1 * 11/2003 Hirano et al. ............... 508/291

FOREIGN PATENT DOCUMENTS

EP     0033860 B1    8/1981
EP     0033860 A2    8/1981

OTHER PUBLICATIONS

International Search Report of Mar. 28, 2002.

* cited by examiner

*Primary Examiner*—J. A. Lorengo
*Assistant Examiner*—Jennine Brown
(74) *Attorney, Agent, or Firm*—Charles Berman; Greenberg Traurig LLP

(57) ABSTRACT

The present invention provides a catalytic activity accelerant. The accelerant is added to stock oil for increasing the catalyst activity, the depth of catalytic hydrogenation and the yield of catalytic hydrogenation product, degrading the reaction conditions of catalytic hydrogenation, and improving the quality of product. The catalytic activity accelerant is consisted of an alkyl succinimide derivative, an alkyl phenol and a surfactant. The amount of the alkyl succinimide derivative in the accelerant is 5–70 wt. %. The amount of the alkyl phenol in the accelerant is 2–70 wt. %. The amount of the surfactant in the accelerant is 2–70 wt. %.

22 Claims, No Drawings

CATALYTIC ACTIVITY ACCELERANT USED IN PETROLEUM HYDROGENATION

FIELD OF THE INVENTION

The present invention relates to a catalytic active accelerant(promoter), which can enhance the catalyst activity, the depth of catalytic hydrogenation and the yield of catalytic hydrogenation product in petroleum hydrogenation.

TECHNICAL BACKGROUND

As an extremely complex system, petroleum comprises not only alkanes, cyclic alkanes and aromatic hydrocarbons of different molecular weight, but also a small amount of sulfides, oxides and nitrides, as well as some trace amounts of metal compounds of iron, copper, nickel, vanadium, etc. In the process of petroleum processing, these hydrocarbon or non-hydrocarbon substances will subject such chemical reactions as cracking, condensing and coking. Now, the catalytic hydrogenation process is usually conducted by adding hydrogen into the feedstock oil under conditions of high temperature and high pressure both at home and abroad. However, with the ever-increasing contradictions between the trend of heavy crude oil and need to be light for the petroleum products, the feedstock oil to the reprocessing device is becoming heavier and inferior in quality, that finally causes some serious problems to the catalyst for hydro cracking, hydro desulfurization and catalytic cracking devices in many refineries and petrochemical plants such as coking, scaling and eventually deactivated, even influencing the catalytic bed of hydro refining and hydro cracking to fasten pressure decline, thus seriously affecting and confining the action cycle and stable operation of the devices.

The problem of catalyst deactivation is obvious especially in the hydro cracking device because of its high reacti n pressure of 15–20 MPa, high temperature of 380–420° C. and the one-lot filling of catalyst of 500–1000 tons. In some cases, the equipment has to be stopped to maintain only after 3 to 5 months' operation due to catalyst deactivation. Thus, it is an urgent task to prevent or alleviate the catalyst deactivation and enhance catalyst efficiency in hydro cracker to lengthen the action cycle to acquire more economic benefits.

The catalysts used in the process of petroleum hydrogenation are inorganic, while the feedstock involved in the hydrogenation reaction are organic materials and non-polar hydrogen. Accordingly, the contacting activity of feedstock with catalyst is relatively poor, and coke easily formed on the surface of the catalyst will affect activity of the catalyst.

There have been quite a few reports both at home and abroad on study of new hydrogenation catalysts in recent years. However, none of them addresses to the addition of catalytic active accelerant to the feedstock oil during the hydrogenation to improve the catalyst activity, the depth of catalytic hydrogenation and the yield of catalytic hydrogenation products, and weaken the reaction conditions of catalytic hydrogenation. It would be a tremendous contribution to the international catalytic hydrogenation techniques that catalytic active accelerant is applied in practical production to increase the catalyst activity and prolong the service life of the catalyst.

DISCLOSURE OF THE INVENTION

The objective of the present invention is to increase the catalyst activity, the depth of catalytic hydrogenation and th yield of catalytic hydrogenation product, weaken the reaction conditions of catalytic hydrogenation, and improve the quality of product by adding a catalytic active accelerant into the fe dstock oil, in the course of catalytic hydrogenation of the p troleum processing.

The objective can be achieved by the following measures:

The catalytic active accelerant of the present invention is composed of alkylsuccinimide derivative, alkylphenol and surfactant.

The alkylsuccinimide derivatives used in the present invention have the following structural formula:

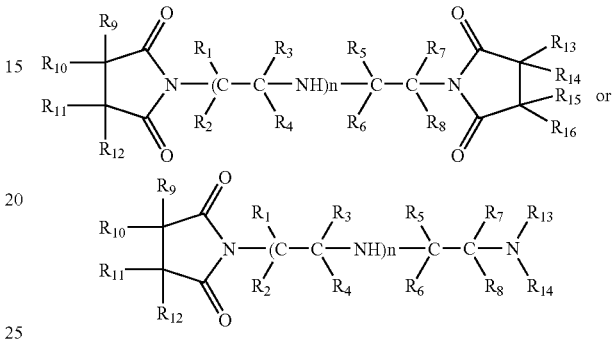

wherein $R_1$ to $R_{16}$ are H or alkyl, n refers to degree of polymerization of CH2CH2N and is a number of 1 to 8.

Either pure or mixed alkylsuccinimide derivatives can be used when making the accelerant, and its percentage by weight in the accelerant is in the range of 5 to 70%, and preferably 10 to 50%.

Th alkylphenols used in the present invention can be the mono- or poly-phenol or naphthol derivatives with its structural formula, for examples, as f llows:

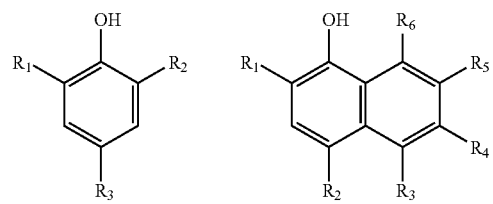

wherein $R_1$ to $R_6$ can be H, OH or alkyl and alkenyl having 1 to 10 carbon atoms.

Either pure or mixed alkylphenols can be used in the accelerant, and its percentage by weight in the accelerant is in the range of 2 to 70%, and preferably 5 to 40%.

The surfactants used in the accelerant of the present invention can be pure or mixed esters non-ionic surfactant produced by reacting the following polyhydric alcohols with fat acids. The polyhydric alcohols can be propanediol, propanetriol, pentaerythritol, cyclohexanepolyols, sorbitol, diethylene glycol, triethylene glycol and mannitol or their mixture. The fat acids can be either saturated or unsaturated fat acids having 6 to 22 carbon atoms.

The $C_1$–$C_{26}$ alkyl sulfonate anionic surfactants can also be used in the accelerant of the present invention.

The percentage by weight of surfactants added to the accelerant is in the range of 2 to 70%, and preferably 7 to 40%.

Solvents used in the accelerant of the present invention are hydrocarbon solvents, which include benzene, toluene, xylene, gasoline, diesel oil, kerosene, petroleum ether, naphtha and cyclic alkane.

EXAMPLES

The catalytic active accelerant of the present invention can be made from alkylsuccinimide derivatives, alkylphenols, and surfactants mentioned above by adding an alkylphenol to an hydrocarbon solvent to form a solution, followed by adding an alkylsuccinimide derivative and a surfactant to said solution, and heating and mixing the mixture at the temperature of 30 to 100° C. by conventional method. For specific operations, see Table 1.

TABLE 1

The composition of the catalytic active accelerant

| Name of accelerant | alkylsuccinimide derivative | alkylphenol | surfactant |
|---|---|---|---|
| HCA-1 | $C_8H_{16}$-substituted bis-succinimide with $N-(CH_2CH_2N)_2CH_2CH_2N$ bridge | 2,4,6-trimethylphenol ($CH_3$, $CH_3$, $CH_3$) | $CH_2CHCH_2OCOC_{18}H_{37}$ with $OH$, $OH$ |
| Weight Percentage | 15% | 20% | 30% |
| HCA-2 | $C_{10}H_{19}$-substituted bis-succinimide with $N-(CH_2CH_2N)_2CH_2CH_2N$ bridge | phenol with $H_3C$, $CH_3$, $C_4H_9$ substituents | pyranose sugar derivative with $HO$, $HO$, $OH$, $OH$ and $CHCH_2OCOC_{18}H_{35}$ |
| Weight Percentage | 40% | 35% | 15% |
| HCA-3 | $C_{12}H_{24}$-substituted mono-succinimide with $N-(CH_2CH_2N)_3CH_2CH_2NH_2$ | phenol with $C_4H_9$, $C_4H_9$, $C_4H_9$ substituents | pyranose sugar derivative with $HO$, $HO$, $OH$, $OH$ and $CHCH_2OCOC_{16}H_{33}$ |
| Weight Percentage | 30% | 20% | 30% |
| HCA-4 | $C_8H_{16}$, $C_8H_{16}$-disubstituted succinimide with $N-(CH_2CH_2N)_2CH_2CH_2NH_2$ | phenol with $C_4H_9$, $C_4H_9$, $CH_3$ substituents | $CH_3CHCH_2OCOC_{16}H_{33}$ with $OH$ |
| Weight Percentage | 20% | 20% | 40% |
| HCA-5 | $C_{20}H_{40}$-substituted bis-succinimide with $N-CH_2CH_2NCH_2CH_2N$ bridge | 1,5-dihydroxynaphthalene ($OH$, $OH$) | cyclohexane with $OCOC_{12}H_{25}$ and $OH$ |
| Weight Percentage | 20% | 15% | 50% |

TABLE 1-continued

The composition of the catalytic active accelerant

| Name of accelerant | alkylsuccinimide derivative | alkylphenol | surfactant |
|---|---|---|---|
| HCA-6 | $C_8H_{16}$ substituted bis-succinimide linked by $N-(CH_2CH_2N)_2CH_2CH_2N$ bridge | 4-methyl-1-naphthol (OH and $CH_3$ on naphthalene) | $(C_{12}H_{25}SO_3)_2Ca$ |
| Weight Percentage | 30% | 15% | 30% |

The reaction conditions for accelerant HCA-1 in Table 1 are: 60° C. for reaction temperature, diesel oil as solvent, 35% of weight percentage.

The reaction conditions for accelerant HCA-2 in Table 1 are: 70° C. for reaction temperature, gasoline as solvent, 10% of weight percentage.

The reaction conditions for accelerant HCA-3 in Table 1 are: 50° C. for reaction temperature, toluene as solvent, 20% of weight percentage.

The reaction conditions for accelerant HCA-4 in Table 1 are: 90° C. for reaction temperature, benzene as solvent, 20% of weight percentage.

The reaction conditions in accelerant HCA-5 in Table 1 are: 80° C. for reaction temperature, kerosene as solvent, 15% of weight percentage.

The reaction conditions in accelerant HCA-6 in Table 1 are: 40° C. for reaction temperature, diesel oil as solvent, 25% of weight percentage.

The efficiency of the catalytic active accelerants according to the present invention was evaluated using dynamic evaluation device for catalytic hydrogenation. The process conditions of evaluation are: concentration of the catalytic active accelerant added of 30 to 200 ppm, operation pressure of 12 to 16 MPa, reaction temperature range of 370 to 400° C., space velocity of 0.7 to 1.5 $h^{-1}$, ratio of hydrogen to oil of 800 to 1000, testing time of 500 hrs. Specific data were shown in Table 2 and Table 3.

TABLE 2

Comparison of operation efficiency with/without catalytic activ accelerant (pressure of 14 MPa and space velocity of 1.0 $h^{-1}$)

| Accelerant | Gasoline yield (%) With Accelerant | Gasoline yield (%) No addition | Diesel oil yield (%) With Accelerant | Diesel oil yield (%) No addition | Total yield (%) With Accelerant | Total yield (%) No addition | Yield increase (%) |
|---|---|---|---|---|---|---|---|
| HCA-1 | 26.7 | 15.6 | 38.5 | 27.8 | 65.2 | 43.4 | 21.8 |
| HCA-2 | 19.8 | 15.4 | 36.6 | 27.3 | 56.4 | 42.7 | 13.7 |
| HCA-3 | 32.6 | 14.9 | 34.2 | 28.4 | 66.8 | 42.4 | 24.4 |
| HCA-4 | 28.3 | 15.0 | 32.7 | 28.0 | 61.0 | 43.0 | 18 |
| HCA-5 | 31.2 | 15.5 | 35.4 | 27.6 | 66.6 | 43.1 | 23.5 |
| HCA-6 | 36.9 | 14.7 | 30.5 | 28.2 | 67.4 | 42.9 | 24.5 |

TABLE 3

Comparison of oil quality (HCA-4,100 ppm)

| Gasoline | With Accelerant (m %) | No addition |
|---|---|---|
| Total alkanes | 59.535 | 48.425 |
| Total cyclic alkanes | 28.628 | 34.927 |
| Total aromatic hydrocarbon | 11.207 | 15.670 |
| Sulfur (ppm) | 9.1 | 180 |
| Nitrogen (ppm) | 0.2 | 0.9 |

| Diesel oil | With Accelerant | No addition |
|---|---|---|
| Saturated hydrocarbon (m %) | 92.50 | 89.29 |
| Monocyclic hydrocarbon (m %) | 7.50 | 10.71 |
| Sulfur (ppm) | <30 | <30 |

| Tail oil | With Accelerant | No addition |
|---|---|---|
| Saturated hydrocarbon, m % | 99.20 | 96.180 |
| Monocyclic hydrocarbon, m % | 0.80 | 3.82 |
| Sulfur (ppm) | <40 | <40 |

As indicated in the above data, the yield of light oil was remarkably increased by addition of catalytic active accelerant. The naphtha, of which the total aromatic hydrocarbon comprises about 11%, the total sulfur content is less that 10 ppm, and the total nitrogen content is less than 0.2 ppm, obtained in this way will provide excellent cracking feedstock to produce ethylene and raw material for hydrogen, or ammonia production. The diesel oil, in which saturated hydrocarbon accounts for about 92.5%, monocyclic aromatic hydrocarbon 7.5%, and the total sulfur content is less than 30 ppm, obtained in this way is high quality diesel and additional component of high cetane. It is a new "green fuel". The tail oil obtained in this way provides good FCC or hydro cracking raw materials since its saturated hydrocarbon content accounts for about 99%. The total yield increase about 20%.

The new catalytic active accelerant developed by the inventors takes the advantage of its activity to improve the contact ability of hydrogen, and petroleum with catalyst. The catalyst will maintain highly active state for a long time since its surface is infiltrated and cleaned by the accelerant. The results of dynamic contrast pilot tests (with or without adding accelerant to the f dstock oil) show that the temperature of catalytic bed can be increased by 1~10° C. and th gross yi ld of gasoline and diesel oil will b increased by 2~25% under th operation conditions of: th conc ntration of th accelerant in the feedstock oil being in the range of 30 to 200 ppm, operation pressure ranging from 12 to 16 MPa, reaction temperature being in the range of 370 to 400° C., space velocity being in the range of 0.7 to 1.5 $h^{-1}$, and ratio of hydrogen to oil being from 800 to 1000. As a result, not only the catalyst activity is improved, and its service life is prolonged, also the operation conditions for catalyzed hydrogenation are weakened. The application of this new accelerant is of tremendous practical significance in improvement of the output of the equipment and reduction of consumption.

What is claimed is:

1. A catalytic active accelerant used in petroleum hydrogenation, wherein the catalytic active accelerant is composed of an alkylsuccinimide derivative, an alkylphenol, and a surfactant, wherein the alkylsuccinimide derivative is comprised at 5 to 70%, the alkylphenol at 2–70%, and the surfactant at 2–70% by weight based on the total weight of the catalytic active accelerant and the alkylsuccinimide derivatives used in the form of the pure or mixture in the present invention have the following structural formulae:

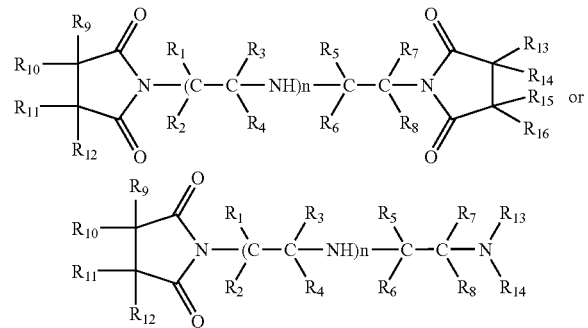

wherein

R1 to R16 are H or alkyl, n refers to degree of polymerization of CH2CH2N, and is a number of 1 to 8.

2. The catalytic active accelerant used in petroleum hydrogenation according to claim 1, wherein the percentage by weight of alkylsuccinimide derivative added in the accelerant is in the range of 10 to 50%.

3. The catalytic active accelerant used in petroleum hydrogenation according to claim 1, wherein the alkylphenol can be the pure or mixture of the mono- or poly-phenol or naphthol derivatives with its structural formulae as follows:

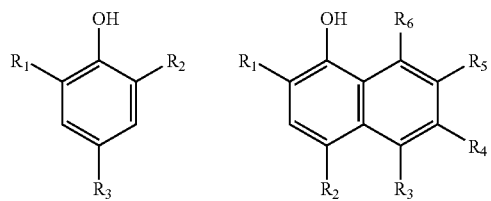

wherein

R1 to R6 are H, OH or the alkyl and alkenyl having 1 to 10 carbon atoms.

4. The catalytic active accelerant used in petroleum hydrogenation according to claim 1, wherein the percentage by weight of alkylphenol added in the accelerant is in the range of 5 to 40%.

5. The catalytic active accelerant used in petroleum hydrogenation according to claim 1, wherein the surfactant used in the accelerant of the present invention is pure or mixed esters non-ionic surfactant produced by reacting polyhydric alcohols with fat acids.

6. The catalytic active accelerant used in petroleum hydrogenation according to claim 5, wherein the polyhydric alcohols are propanediol, propanetriol, pentaerythritol, cyclohexanepolyols, sorbitol, diethylene glycol, triethylene glycol, or mannitol.

7. The catalytic active accelerant used in petroleum hydrogenation according to claim 5, wherein the fat acids are either saturated or unsaturated fat acids having 6 to 22 carbon atoms.

8. The catalytic active accelerant used in petroleum hydrogenation according to claim 1, wherein the surfactant used in the accelerant of the present invention is anionic surfactant of C1–C26 alkyl sulfonate.

9. The catalytic active accelerant used in petroleum hydrogenation according to claim 1, wherein the percentage by weight of surfactant added in the accelerant is in the range of 7 to 40%.

10. The catalytic active accelerant used in petroleum hydrogenation according to claim 1, wherein solvents are used in the catalytic active accelerant and the solvents are hydrocarbon solvents.

11. The catalytic active accelerant used in petroleum hydrogenation according to claim 10, wherein the hydrocarbon solvents used in the catalytic active accelerant are benzene, toluene, xylene, gasoline, diesel oil, kerosene, petroleum ether, naphtha or cycloalkanes.

12. The catalytic active accelerant used in petroleum hydrogenation according to claim 1, wherein the percentage by weight of alkylsuccinimide derivative added in the accelerant is in the range of 10 to 50%.

13. The catalytic active accelerant used in petroleum hydrogenation according to claim 3, wherein the percentage by weight of alkylphenol added in the accelerant is in the range of 5 to 40%.

14. The catalytic active accelerant used in petroleum hydrogenation according to claim 5, wherein the percentage by weight of surfactant added in the accelerant is in the range of 7 to 40%.

15. The catalytic active accelerant used in petroleum hydrogenation according to claim 8, wherein the percentage by weight of surfactant added in the accelerant is in the range of 7 to 40%.

16. A catalytic active accelerant composed of:
an alkylsuccinimide having the following structural formulae:

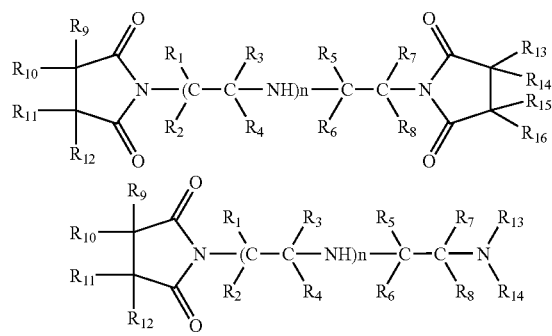

wherein
R1 to R16 are H or alkyl, n refers to degree of polymerization of CH2CH2N, and is a number of 1 to 8;
an alkylphenol selected from the group consisting of the mono-, poly-phenol and naphthol derivatives of the following structural formula:

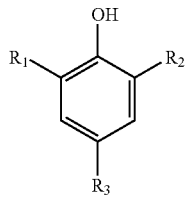 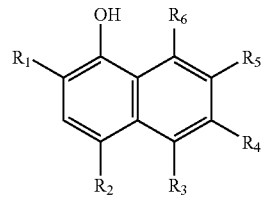

wherein
R1 to R6 are H, OH or the alkyl and alkenyl having 1 to 10 carbon atoms; and
a surfactant selected from the group consisting of esters non-ionic surfactant produced by reacting polyhydric alcohols with fat acids.

17. The catalytic active accelerant according to claim 16, wherein the alkylsuccinimide derivative, the alkylphenol, and the surfactant are comprised at 5 to 70%, 2–70%, and 2–70% by weight, respectively, based on the total weight of the catalytic active accelerant.

18. The catalytic active accelerant according to claim 16, further comprising solvents wherein the solvents used in the catalytic active accelerant of the present invention are hydrocarbon solvents.

19. The catalytic active accelerant used in petroleum hydrogenation according to claim 16, wherein the catalytic active accelerant is selected from the group consisting of HCA-1, HCA-2, HCA-3, HCA-4, HCA-5 and HCA-6.

20. A method to catalyze petroleum hydrogenation, comprising the operation of contacting petroleum feedstock with a catalytic active accelerant composed of an alkylsuccinimide derivative, an alkylphenol, and a surfactant, wherein the alkylsuccinimide derivative comprises 5 to 70%, alkylphenol 2–70%, and surfactant 2–70% by weight based on the total weight of the catalytic active accelerant the alkylsuccinimide derivative having the following structural formulae:

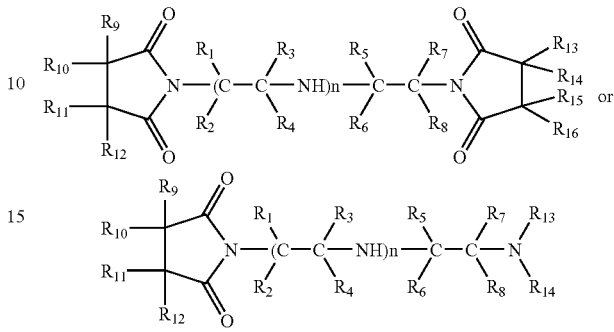

wherein
R1 to R16 are H or alkyl. n refers to a degree of polymerization of $CH_2CH_2N$. and is a number of 1 to 8.

21. The method of claim 20, wherein the catalytic active accelerant comprises:
an alkylphenol selected from the group consisting of the mono-, poly-phenol and naphthol derivatives of the following structural formula:

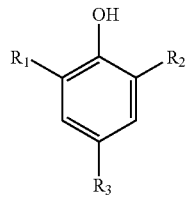 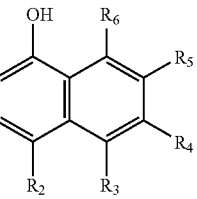

wherein
R1 to R6 are H, OH or the alkyl and alkenyl having 1 to 10 carbon atoms; and
a surfactant selected from the group consisting of esters non-ionic surfactant produced by reacting polyhydric alcohols with fat acids.

22. The method according to claim 20, wherein the catalytic active accelerant is selected from the group consisting of HCA-1, HCA-2, HCA-3, HCA-4, HCA-5 and HCA-6.

* * * * *